(12) United States Patent
Behnia (10) Patent No.: US 8,269,546 B2
(45) Date of Patent: Sep. 18, 2012

(54) OPTICAL MODULATOR DRIVE CIRCUIT

(75) Inventor: Babak Behnia, San Francisco, CA (US)

(73) Assignee: Infinera Corporation, Sunnyvale, CA (US)

( * ) Notice: Subject to any disclaimer, the term of this patent is extended or adjusted under 35 U.S.C. 154(b) by 217 days.

(21) Appl. No.: 12/567,770

(22) Filed: Sep. 27, 2009

(65) Prior Publication Data

US 2011/0074487 A1 Mar. 31, 2011

(51) Int. Cl.
*H03K 5/00* (2006.01)

(52) U.S. Cl. ............ 327/359; 327/355; 327/51; 327/52

(58) Field of Classification Search .................. 327/355, 327/359, 51, 52
See application file for complete search history.

(56) References Cited

U.S. PATENT DOCUMENTS

| | | | | |
|---|---|---|---|---|
| 4,547,685 A * | 10/1985 | Wong | | 327/54 |
| 4,633,223 A * | 12/1986 | Senderowicz | | 341/118 |
| 7,132,883 B2 * | 11/2006 | Huijsing et al. | | 330/9 |
| 7,209,000 B2 * | 4/2007 | Huijsing et al. | | 330/9 |
| 7,555,263 B1 * | 6/2009 | Rofougaran et al. | | 455/20 |
| 7,724,080 B2 * | 5/2010 | Luff | | 330/9 |
| 7,816,970 B2 * | 10/2010 | Kim | | 327/359 |
| 2004/0125879 A1 * | 7/2004 | Jaussi et al. | | 375/259 |
| 2006/0038610 A1 * | 2/2006 | Gudem et al. | | 327/552 |
| 2007/0285166 A1 * | 12/2007 | Shia et al. | | 330/258 |
| 2009/0153382 A1 * | 6/2009 | Philips | | 341/143 |
| 2009/0309653 A1 * | 12/2009 | Luff | | 330/9 |
| 2010/0283538 A1 * | 11/2010 | Zanchi et al. | | 330/69 |

* cited by examiner

*Primary Examiner* — Ryan Jager
(74) *Attorney, Agent, or Firm* — Ross M. Carothers; David L. Soltz (57) ABSTRACT

A modulator drive circuit provides a modulator drive signal, representative of a data waveform, to modulate an optical signal for transport across a network infrastructure. The modulator drive circuit includes a broadband Bias-T circuit insensitive to the frequency range of the data waveform. The Bias-T circuit provides for an adjustable bias level to maintain proper operation of a modulator used to modulate the optical signal. One or more modulator drive circuits may be provided on a single substrate.

18 Claims, 12 Drawing Sheets

OPTICAL MODULATOR DRIVE CIRCUIT

BACKGROUND OF THE INVENTION

1. Field of the Invention

This invention relates generally to modulator drivers and, more particularly, to a modulator bias control including a broadband Bias-T network.

2. Description of the Related Art

Modulator drive circuits have become commonplace in telecommunication systems. Generally, such a modulator drive circuit accepts a data signal as an input, e.g. a data signal to be transmitted over a network infrastructure, and generates a corresponding modulator drive signal to be provided to a modulator, e.g. a Mach-Zehnder modulator (MZM) or a semiconductor electro-absorption modulator (EAM). In response to the output modulator drive signal the modulator then modulates an optical carrier to facilitate optical transmission of the data signal across the network infrastructure. The modulator drive signal provided to the modulator generally comprises two signal components, a first signal component which represents the data waveform to be transmitted across a network infrastructure and a second signal component which is used to bias the modulator to ensure that the modulator is operating to efficiently modulate the optical carrier. The data waveform is characterized by a defined amplitude and a random sequential bit sequence corresponding to the data, while the second signal component is often referred to as the DC bias.

Figure 1:
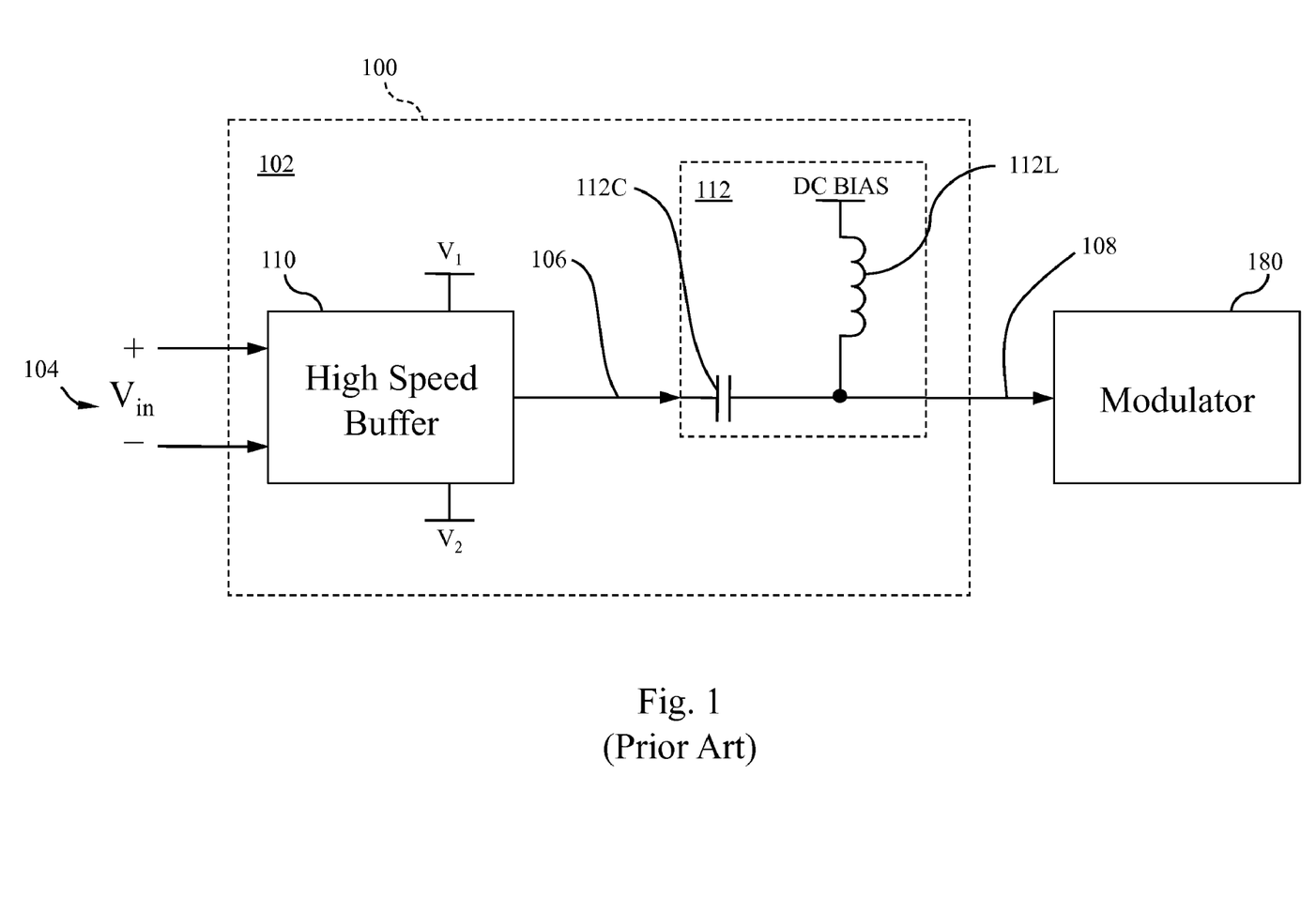
FIG. 1 is a general circuit diagram of a modulator drive circuit in the prior art.

With reference to FIG. 1, a first known modulator drive circuit 100, which utilizes a bias circuit in the signal path, is shown. More specifically, drive circuit 100 comprises a high speed buffer 110, and a bias circuit 112, also referred herein as Bias-T circuit 112, located external to the high speed buffer 110 and in the signal path of a modulator driver output signal 108. The high speed buffer 110 is configured to accept an input data signal 104, labeled "$V_{in}$" in FIG. 1. Although not necessary, typically the input data signal 104 is a differential signal as depicted. The high speed buffer 110 generates an output signal 106 in response to the received input data signal 104, the output signal 106 provided to the bias circuit 112. The primary purpose of the high speed buffer 110 of FIG. 1 is to transform the differential input signal 102 into a signal having a sufficient amplitude to drive a modulator 180, for example a Mach-Zehnder modulator or an electro-absorption modulator. Additionally, the primary purpose of the Bias-T circuit 112 is to provide the modulator 180 with a suitable bias level for efficient optical modulation. For clarity, the output signal 106 is depicted as a single-ended signal, however output signal 106 could be a differential signal including a first signal portion and a second signal portion, each portion applicable to the following discussion herein. The high speed buffer 110 is powered via a fixed voltage differential power supply which provides an upper fixed voltage of $V_1$ and a lower fixed voltage of $V_2$ to high speed buffer 110, as shown. The fixed voltage supply provides a suitable voltage range, $V_1$-$V_2$, to accommodate the amplitude of the differential input data signal 104.

The bias circuit 112 comprises a capacitor 112C, an inductor 112L, and an adjustable DC bias voltage input, labeled DC BIAS in FIG. 1. The output signal 106 of the high speed buffer 110 is AC coupled through the capacitor 112C and passed on to the modulator 180 as a data waveform of a modulator drive signal 108. Additionally, capacitor 112C correspondingly blocks any DC voltage signal which may exist as part of output signal 106, preventing the DC signal from entering the Bias-T 112. The bias signal voltage, labeled "DC BIAS", is coupled through the inductor 112L and passed on to the modulator 180, the capacitor 112C also preventing the bias signal voltage from exiting the Bias-T 112 and entering the high speed buffer 110. Additionally, the inductor 112L prevents the bias circuit which develops the DC BIAS (not shown) from loading the high speed buffer 110, thus the output signal 106 passes through the capacitor 112C and straight on to the modulator 180.

Such a circuit 100, however, has several drawbacks. First, the Bias-T circuit 112 has a desired frequency range of operation limited by the selected capacitor 112C and inductor 112L utilized. Typically the capacitor 112C and inductor 112L are selected to provide a low-pass cut-off frequency which is lower than the low-pass cut-off frequency of the spectrum of the data waveform at the output of the high speed buffer 110. Thus, the response of the cascaded high speed buffer 110 and the bias-T circuit 112 will not be broadband if the data waveform spectrum extends below the Bias-T 112 cut-off frequency, leading to undesirable distortion in the modulator output signal during broadband operation.

Second, with the frequency range of a broadband modulator driver being inversely proportional to the impedance of the capacitor 112C, a broadband modulator driver requires relatively large physical die areas for the components of the Bias-T 112. This problem is exacerbated by the fact that the modulator drive circuit 100 may be one of a plurality of modulator drive circuits, where it is desired to provide the plurality of modulator drive circuits on a single substrate as part of a semiconductor integrated circuit chip. Moreover, it is desirable to reduce the distance of the signal path between the high speed buffer 110 and the modulator 180 to correspondingly reduce, or otherwise minimize, the associated transmission line effects.

What is needed is a broadband modulator drive circuit which generates a proper modulator drive signal over a broad range of operating frequencies. Also, what is needed is a broadband modulator drive circuit which includes a broadband Bias-T circuit which provides a proper modulator drive signal regardless of the frequency range of the data waveform. What is further needed is a broadband Bias-T circuit providing for an adjustable bias level. Still, what is needed is a modulator drive circuit which includes circuitry to allow for correcting response errors due to fabrication tolerances. Last, what is needed is the ability to provide an array of such modulator driver circuits on a single substrate.

SUMMARY OF THE INVENTION

According to this disclosure, embodiments of the present invention include a modulator drive circuit for providing a modulator drive signal over a broad frequency range, the modulator drive signal being insensitive to the frequency range of the corresponding data waveform. In certain embodiments of the present invention, the modulator drive circuit accepts a data signal and provides a first output response signal and a second output response signal which are combined to form the modulator drive signal, the second output response signal being complementary to the first output response signal. In further embodiments, the modulator drive circuit includes a bias voltage which is combined as part of the modulator drive signal, the bias voltage may be programmable to provide for fine tuning of the bias voltage. Programmability of the bias voltage may be achieved through the use of digital signal communication. In still other embodiments the modulator drive circuit accepts a differential input signal and provides a differential modulator drive signal. Preferably, the modulator drive circuit is provided on a single substrate, for example as part of a photonic integrated circuit. In still certain other embodiments of the present invention, a plurality of modulator drive circuits are fabricated on a single substrate in a photonic integrated circuit.

Other objects, features and advantages of the invention will be apparent from the drawings, and from the detailed description that follows below.

BRIEF DESCRIPTION OF THE DRAWINGS

In the drawings wherein like reference symbols refer to like parts.

DETAILED DESCRIPTION OF THE INVENTION

Bias-T circuits having passive components, such as the Bias-T circuit 112 of FIG. 1, have corresponding filtering affects on the received data waveform. Under certain conditions, therefore, the modulator drive output signal, e.g. output signal 108, can be distorted. For example, where the data received by the high speed buffer is constant for relatively long time periods the modulator output signal will start to distort due to the decaying of the modulator output signal 108 voltage based upon the values of the passive components. When substantial decay of the modulator output signal 108 occurs the modulator will generate an undesirable output, one which no longer corresponds to the received data waveform, the output signal of the high speed buffer for example. The present invention provides a solution which automatically maintains a flat response at the modulator driver circuit output over broadband operation.

Figure 2A:
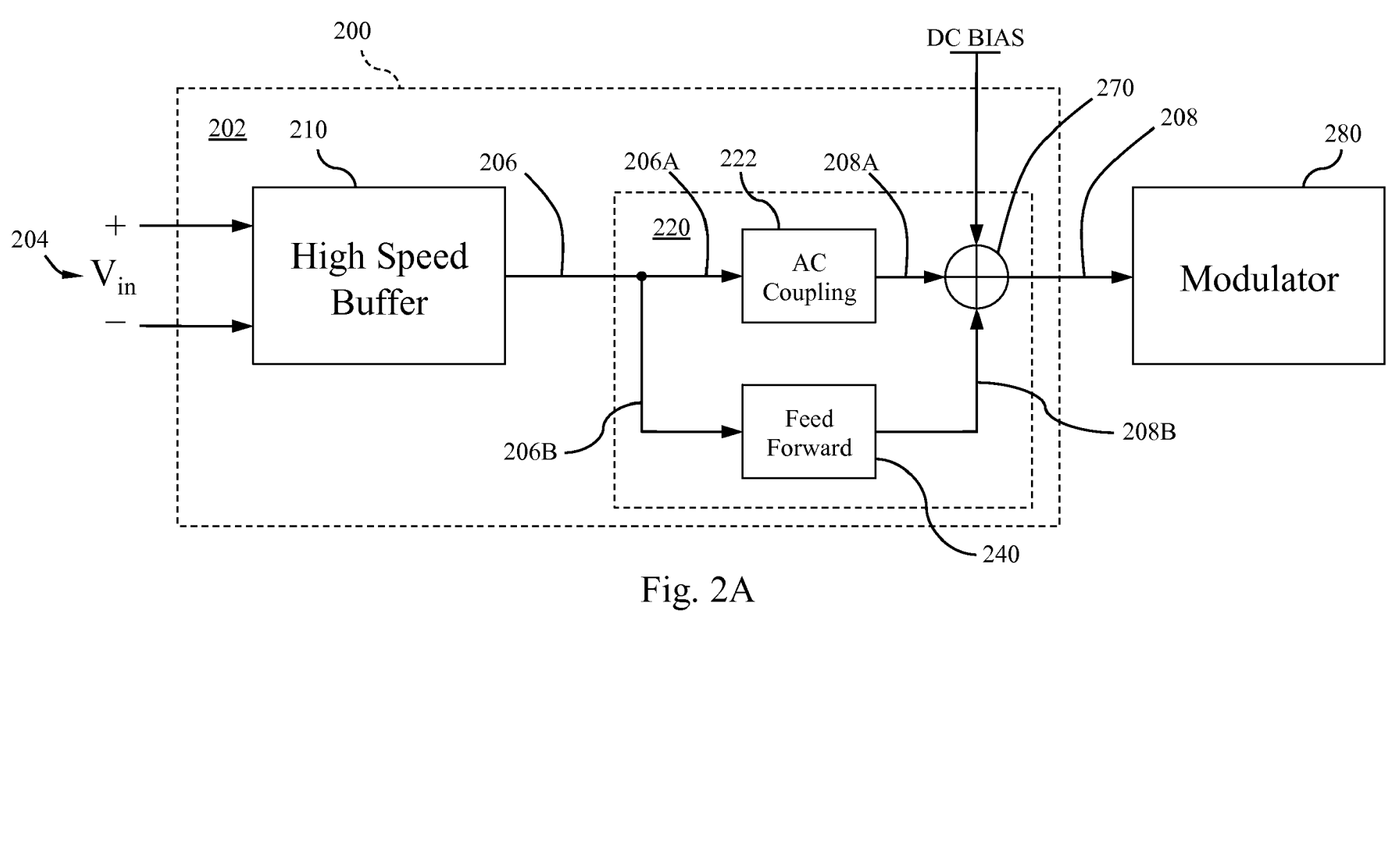
FIG. 2A is a general block diagram of a broadband Bias-T circuit, according to certain aspects of the present invention.

Reference is now made to FIG. 2A, depicting a general block diagram of a first embodiment of a broadband Bias-T circuit, according to certain aspects of the present invention. Modulator drive circuit 200 comprises a high speed buffer 210, a broadband Bias-T circuit 220 outlined in dashed line, broadband Bias-T circuit 220 providing a modulator drive signal 208 to a modulator 280, a Mach-Zehnder modulator or an electro-absorption modulator for example. Preferably, the high speed buffer 210 and the broadband Bias-T 220 are provided on a single substrate 202 depicted in dashed line in FIG. 2A. The modulator drive signal 208 comprises a data waveform portion and a DC bias portion. The data waveform corresponds to the data received at the input of the high speed buffer 210, the frequency of the data waveform dynamically changing according to the data received. The DC bias, labeled "DC BIAS", corresponds to the bias level provided to the modulator to ensure proper modulation of the data, e.g. the data waveform.

As shown in FIG. 2A, a differential signal 204, labeled "$V_{in}$", is provided to the modulator drive circuit 200, and more specifically, provided as an input to the high speed buffer 210. While shown originating external to substrate 202, the differential signal 204 may be derived, at least in part, in a circuit, or circuits, provided on substrate 202. In response to the input signal 204, the high speed buffer 210 provides an output signal 206 to the broadband Bias-T 220 for further processing. For purposes of simplicity, output signal 206 is depicted as a single ended signal, however output signal 206 can also be a differential signal as discussed in greater detail below. The signal 206 comprises the data waveform, e.g. the data which is to be transmitted over the network infrastructure.

After leaving the high speed buffer, the output signal 206 is split into a first output signal 206A and a second output signal 206B. The first output signal 206A is provided to an AC coupling circuit 222, and the second output signal 206B is provided to a feed forward circuit 240, as part of the broadband Bias-T circuit 220. While depicted as being provided to the Bias-T circuit 220 as the output signal 206, as should be readily understood, the signal 206 can be split into first and second output signals 206A, 206B prior to being provided to the Bias-T 220 (not shown).

The AC coupling circuit 222 couples the data waveform received from the high speed buffer 210, as part of the signal 206A, to a summer circuit 270, while blocking any DC component present. The AC coupling circuit 222 cooperates with other passive components of the summer circuit 270 to define a cut-off frequency, $f_c$, associated with the data waveform as part of the output signal 206, as discussed in more detail below, acting as a high-pass filter for example. Thus, when the frequency of the data within the data waveform drops below the cut-off frequency $f_c$ decay of the signal 208A output from the AC coupling circuit 222 can occur, eventually leading to distortion in the modulator output signal 208. Simultaneously, the feed forward circuit 240 receives signal 206B and provides an output signal 208B to the summer 270. As will be more readily understood in the further discussion below relative to additional embodiments of the present invention, the feed forward circuit 240 is configured to provide the output signal 208B for the data waveform having frequency components less than fc, the output signal 208B being complementary to the output signal 208A such that the summation of signal 208A and 208B by the summer circuit 270 provides for a flat response during broadband operation. For example, as better understood with reference to the discussion of FIG. 3A, as the signal 208A decays, due to an effective data frequency lower than the cut-off frequency $f_c$, the signal 208B increases at the same rate, the summation or combination of 208A and 208B resulting in a flat response. Output signal 208A and output signal 208B represent the data waveform and a DC bias input, labeled "DC BIAS", provides the desired bias level to the summer 270. Thus, the modulator driver output signal 208 comprises the data waveform at the desired bias level during broadband operation to ensure proper operation of the modulator 280.

Figure 2B:
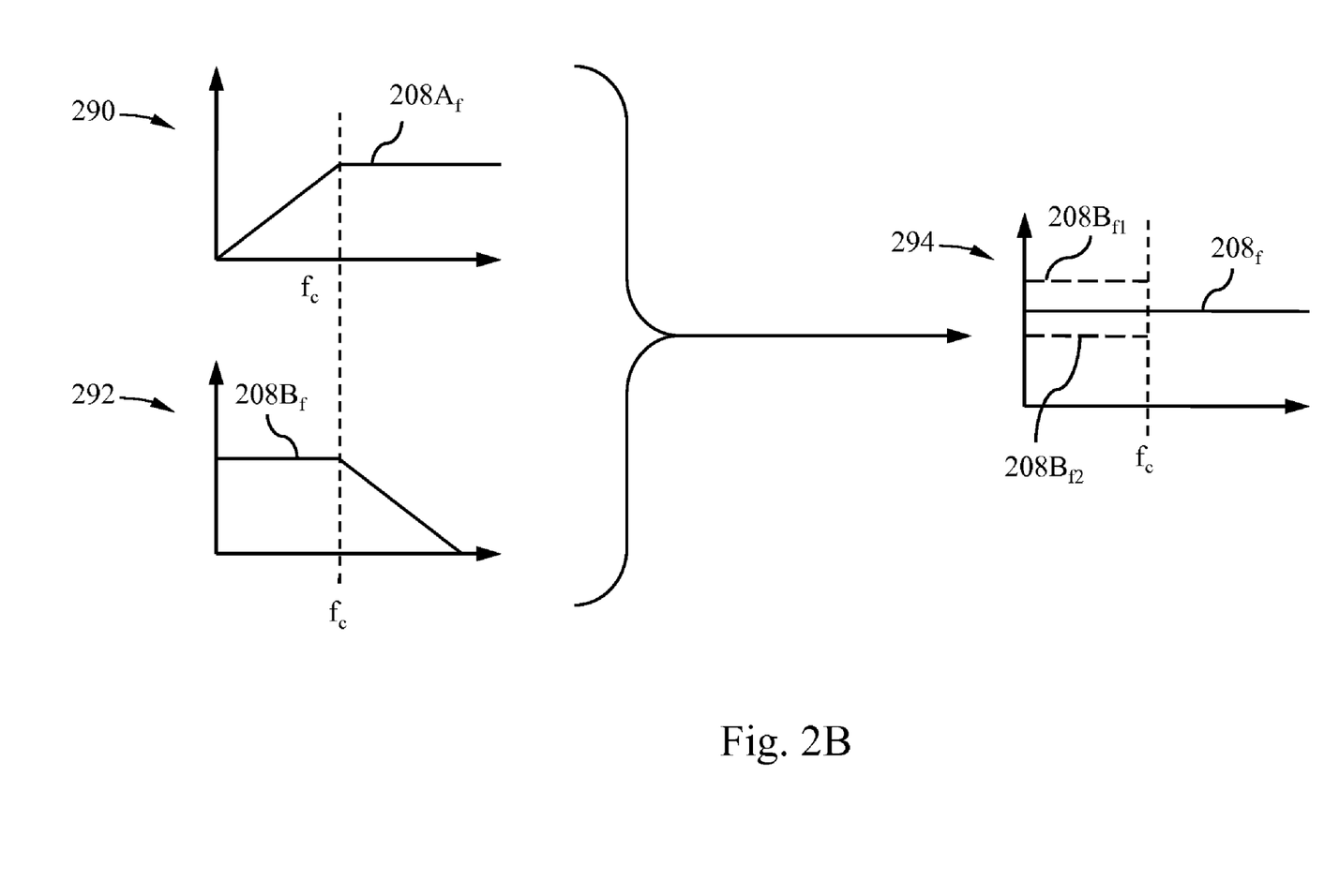
FIG. 2B depicts various portions of the modulator driver output signal of the FIG. 2A embodiment in the frequency domain, according to certain aspects of the present invention.

The functionality of summer 270 can be better understood with reference to FIG. 2B. A first graph 290 of FIG. 2B depicts an exemplary output response curve in the frequency domain, e.g. amplitude vs. frequency, of signal 208A, labeled "$208A_f$", having a flat response above the cutoff frequency $f_c$. A second graph 292 of FIG. 2B depicts an exemplary output response curve in the frequency domain of signal 208B, labeled "$208B_f$", having a flat response below the cutoff frequency $f_c$. A third graph 294 depicts the broadband modulator drive output signal 208 of summer 270, the output having a substantially flat response during broadband operation. Due to fabrication tolerances, the various components of the modulator driver circuit 200 may lead to the AC coupling circuit 222 having a different gain or amplitude of the output signal 208B from the feed forward circuit 240 which is greater than or less than the amplitude of the output signal 208A from the AC coupling circuit 222. For example, while the amplitude of the output response curve of the feed forward circuit 240 may be at the value as depicted in graph 294, due to fabrication tolerances, the amplitude of the output response curve of the AC coupling circuit 222 may be greater than the amplitude of the output response of the feed forward circuit 240 as depicted in dashed line as curve $208B_{f1}$, or less than the amplitude of the output response of the feed forward circuit 240 as depicted in dashed line as curve $208B_{f2}$. As described in greater detail in reference to FIG. 3A, the bias input may include further adjustment to compensate for such fabrication tolerances such that the modulator driver output signal 208 has a substantially flat response and a desired bias level during broadband operation, from about 0 to about 10 G Hz for example.

Figure 3A:
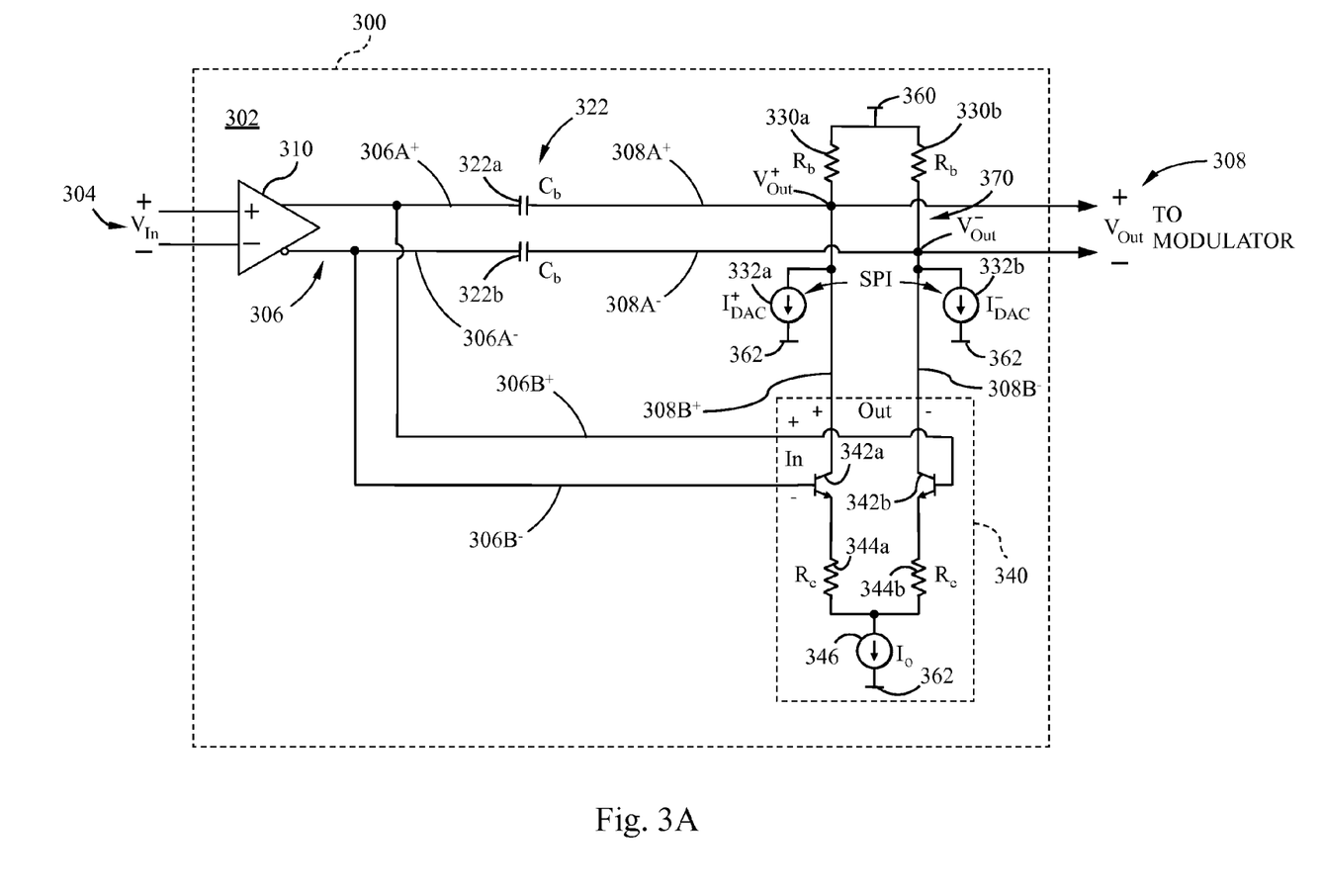
FIG. 3A is a general circuit diagram of a broadband Bias-T circuit, according to certain aspects of the present invention.

FIG. 3A is a general circuit diagram of a broadband Bias-T circuit, according to certain aspects of the present invention. A modulator drive circuit 300 comprises a high speed buffer 310 and a broadband Bias-T circuit including a coupling circuit 322, a feed forward circuit 340, and a summer or summing point 370, preferably all provided on a single substrate 302. The modulator drive circuit 300 operates within a voltage range defined by a first voltage potential 360 and a second voltage potential 362, the first voltage having a greater potential than the second voltage. An input signal 304 is provided to the high speed buffer 310. In response to the input signal 304, high speed buffer 310 provides a differential output signal 306. The output signal 306 is split and an output signal 306A is provided to the coupling circuit 322 and an output signal 306B is provided to the feed forward circuit 324. Coupling circuit 322 comprises a first capacitor 322a and a second capacitor 322b which allow, or otherwise pass, a data waveform as part of the high speed buffer 310 differential output signal 306A to summer 370 represented by a differential signal 308A. The coupling circuit 322 couples the high speed digital signal representative of the data waveform, while blocking any DC voltages present at the output 306A of the high speed buffer 310. The first and second capacitors 322a, 322b cooperate with resistors 330a, 330b of the summer 370 to define a cut-off frequency $f_c$, for example a high pass cut-off frequency. The first and second capacitors 322a, 322b, as well as the resistors 330a, 330b are configured to be substantially identical to each other, respectively, to ensure proper filtering of the differential output signal 306, e.g. 306A.

The feed forward circuit 340, outlined in dashed line, comprises a differential pair circuit including a first transistor 342a and a second transistor 342b, a first resistor 344a and a second resistor 344b, and a current source 346. The first transistor 342a has a base connected to the output signal 306B⁻ received from the high speed buffer 310. The collector of the first transistor 342a is coupled to the summer at the output node $V_{Out}^+$, and an emitter of the first transistor 342a is coupled to the first end of the first resistor 344a. That signal provided by the feed forward circuit 340 to the output node $V_{Out}^+$ is represented by a signal 308B⁺. A second end of the first resistor 344a is coupled to a first end of the current source 346, the second end of the current source 346 coupled to the second voltage potential 362. The second transistor 342b has a base connected to the output signal 306B⁺ from the high speed buffer 310. The collector of the second transistor 342b is coupled to the summer at the output node $V_{Out}^-$, and an emitter coupled to the first end of the second resistor 344b. That signal provided by the feed forward circuit 340 to the output node $V_{Out}^-$ is represented by a signal 308B⁻. A second end of the second resistor 344b is coupled to the first end of the current source 346.

It is important to note that the signals 308A⁺, 308A⁻, 308B⁺, and 308B⁻, are not the voltages at those locations, per se, e.g. by definition the voltage potentials at 308A⁺, $V_{Out}^+$, and 308B⁺ are the same. Rather, the designations of signals 308A and 308B merely represent that portion of the output signal 308 attributed to the output of the AC coupling circuit 322 and the feed forward circuit 340, respectively. For example, signals 308A and 308B may be determined through superposition techniques, signal 308A obtained by providing the input 304 to the AC coupling circuit 322 while electrically disconnecting the input 304 from the feed forward circuit 340 and shorting the input to the feed forward circuit 340, e.g. electrically coupling the base of the transistor 342a to the base of the transistor 342b. Similarly, signal 308B can be obtained by providing the input 304 to the feed forward circuit 340 while electrically disconnecting the input 304 from the AC coupling circuit 322 and shorting the input to the AC coupling circuit 322, e.g. electrically coupling the first capacitor 322a to the second capacitor 322b on the side opposite the signal 308. In this sense, the summer 370 does not in fact sum different voltages in the traditional manner, but rather is a location whose potential is dependent on the outputs of both the AC coupling circuit 322 and feed forward circuit 340. Unless stated otherwise, this pertains to the signals 308A and 308B, and their derivatives, discussed herein.

The summer circuit 370 of FIG. 3A includes the first and second resistor 330a, 330b, and a first and second current source 332a, 332b. As mentioned above, the resistors 330a, 330b of the summer 370 cooperate with the first and second capacitors 322a, 332b to provide the desired cutoff frequency, $f_c$, of the coupling circuit 322, as well as the feed forward circuit 340.

Thus, the summer 370 sums, or otherwise represents the combination of, the output 308A from the coupling circuit 322 with the output 308B from the feed forward circuit 340 at the node $V_{Out}$. More specifically, the summer 370 sums the output 308A⁺ from the coupling circuit 322 with the output 308B⁺ from the feed forward circuit 340 at the node $V_{Out}^+$, and the summer 370 sums the output 308A⁻ from the coupling circuit 322 with the output 308B⁻ from the feed forward circuit 340 at the node $V_{Out}^-$. In operation, considering a positive going pulse at $V_{in}$ 304, a corresponding positive going pulse is provided by the high speed buffer 310 at output 306A⁺. This positive going pulse is coupled through the first capacitor 322a to the output node labeled $V_{Out}^+$. The corresponding differential voltage pulse at inverted output 306B⁻ of the high speed buffer 310 is provided to the first transistor 342a of the feed forward circuit 340. The first transistor 342a is configured to conduct current upon the receipt of the differential voltage pulse, this current acting to develop an additional voltage at the output 308B⁺ of the feed forward circuit 340. The first capacitor 322a and the first resistor 330a, while acting to provide a high pass filter component to the coupled input signal 306A⁺, also provide for a low pass filter component with respect to the output 308B⁺ of the feed forward circuit 340. More specifically, the relatively high speed voltage change at the output 308B⁺ due to the current through the collector current of the first transistor 342a is not seen at the output node $V_{Out}^+$ due to the nature of the low pass filter component provided by the first capacitor 322a and the first resistor 330a.

Figure 3B:
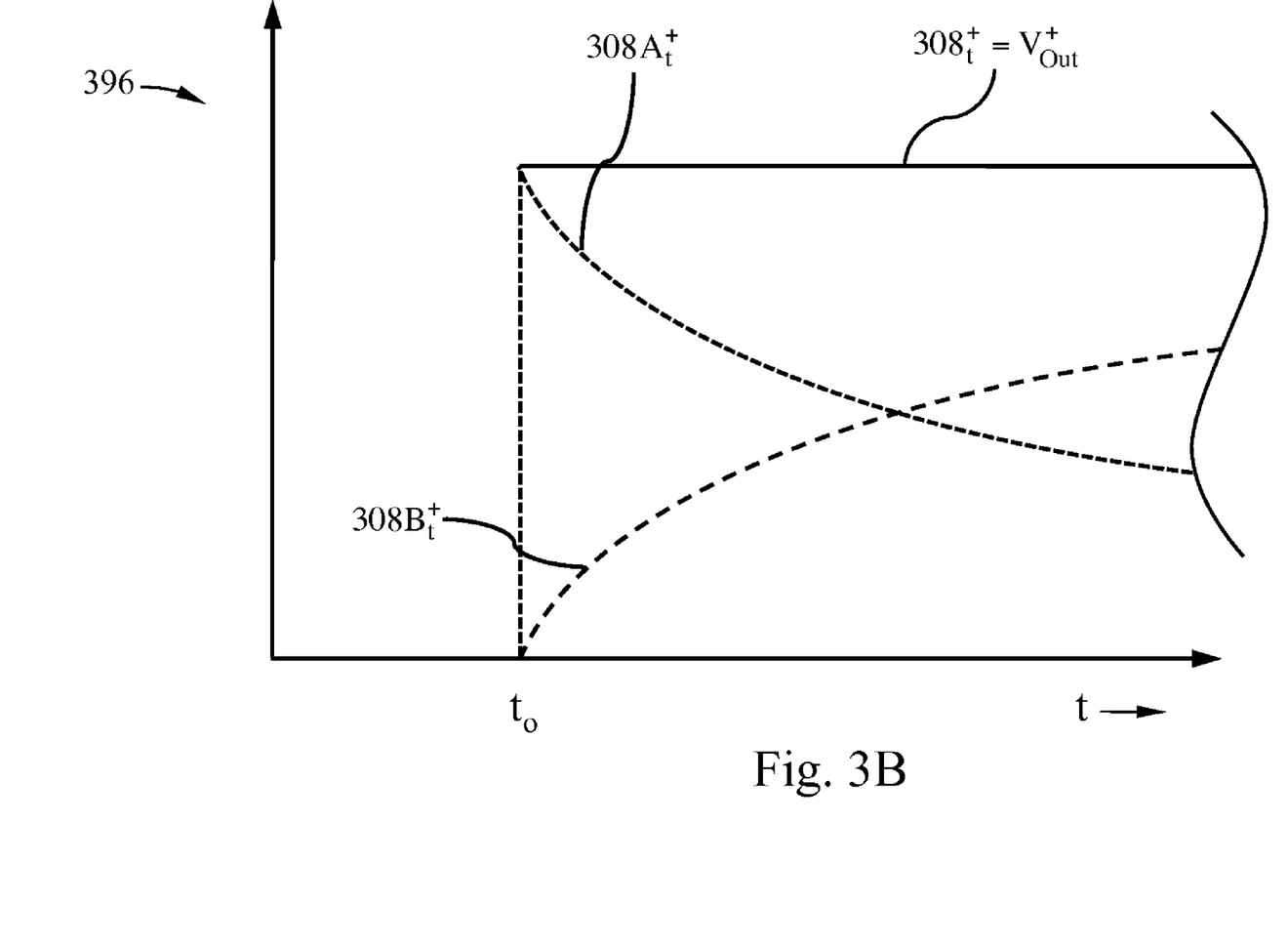
FIG. 3B depicts various portions of the modulator driver output signal of the FIG. 3A embodiment in the time domain, according to certain aspects of the present invention.

Assuming that the input positive going pulse has a period greater than the timing constant defined by the first capacitor 322a and the first resistor 330a, for example when the data frequency is less than the cut-off frequency $f_c$, the output 308A⁺ of the coupling circuit will start to decrease or decay, while the output 308B⁺ will increase. FIG. 3B depicts a graph 396 of the outputs 308A⁺, 308B⁺, and the summed output at node $V_{Out}^+$, e.g. 308⁺, in the time domain and labeled as curves $308A_t^+$, $308B_t^+$, and $308_t^+$ (the output at node $V_{Out}^+$), respectively. As indicated by curve $308A_t^+$, the positive pulse is coupled to the output $308A_t^+$ through the coupling circuit 322, but after a time period greater than the timing constant defined by the first capacitor 322a and the first resistor 330a the output $308A_t^+$ starts to decrease, for example during long trains of 1s as part of the data waveform. Such decay, if not compensated for, would result in undesirable distortion in the modulator drive output signal 308 and improper modulator 380 operation. Since the first capacitor 322a and the first resistor 330a define the timing constant with respect to the decrease and increase in both the coupling circuit 322 output 308A and the feed forward circuit output 308B, the amount that the output 308A⁺ decreases at any given time will be substantially equivalent to the amount the output 308B⁺ increases. In this way the output at node $V_{Out}^+$, which is the summation of the output 308A⁺ and the output 308B⁺, remains constant or substantially flat regardless of the data rate of the data waveform. Thus, as depicted in FIG. 3B by curve $308B_t^+$, the output 308B⁺ increases at the exact same rate as the output 308A⁺ decreases, such that the output 308⁺, corresponding to the output at node $V_{Out}^+$, remains flat, the output depicted as curve $308_t^+$ or $V_{Out}^+$ in FIG. 3B.

Figure 3C:
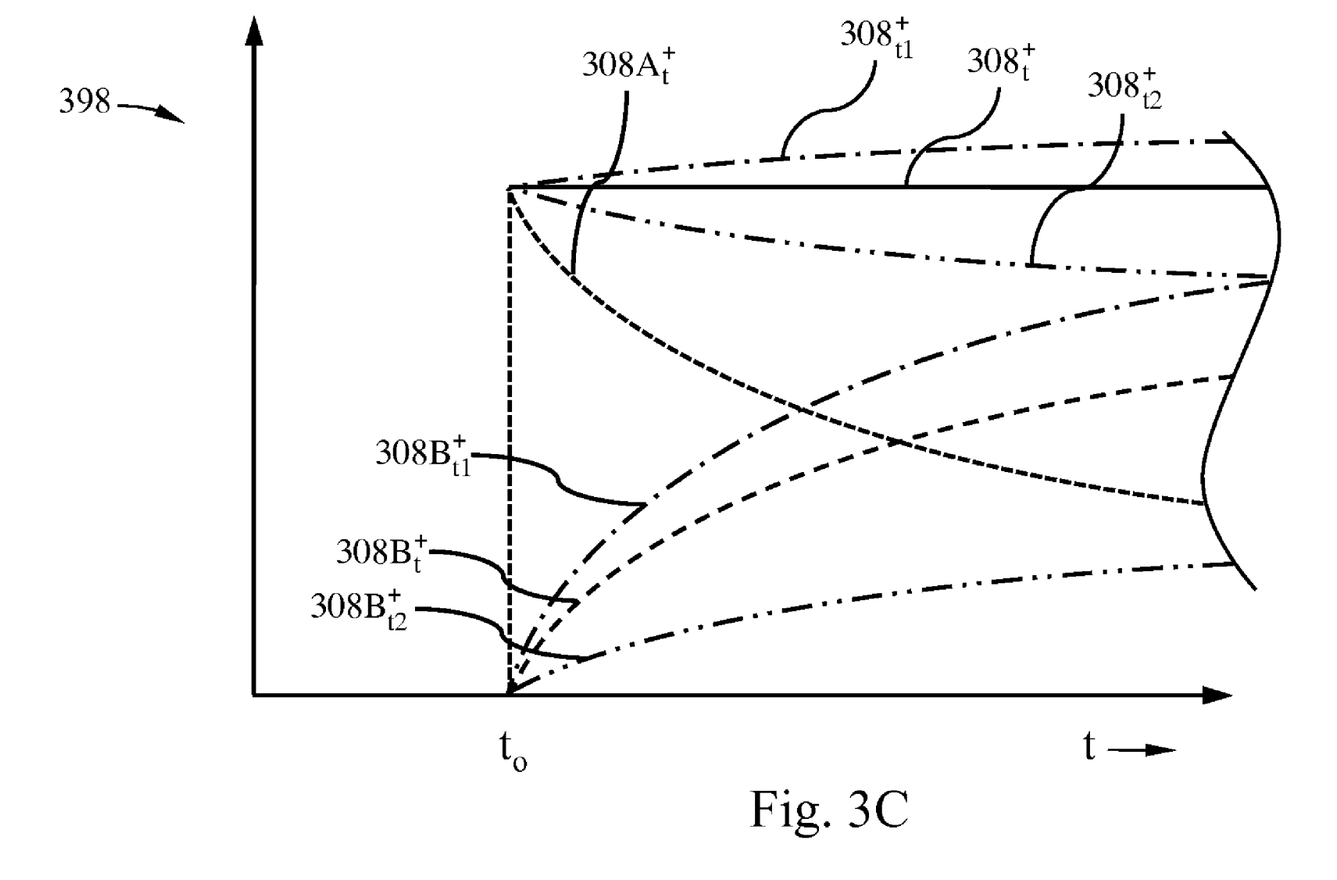
FIG. 3C depicts additional details of various portions of the modulator driver output signal of the FIG. 3A embodiment in the time domain.

As previously discussed, due to the tolerances of the fabrication process the gain of the feed forward circuit 340 may be greater than or less than a desired gain, the gain of the coupling circuit 322 for example. In such a case the response of the Bias-T circuit 300 may not be flat over the desired bandwidth of operation. Rather, as discussed above, a first response will be observed for frequencies below the cut-off frequency, $f_c$, depicted for example as dashed line $208B_1$ or dashed line $208B_2$ in FIG. 2B, while a second response will be observed for frequencies greater than the cut-off frequency, $f_c$. A graph 398 of FIG. 3C depicts exemplary outputs of 308B⁺ in the time domain where, for example, the output 308B⁺ is greater than unity, as shown in curve $308B_{t1}^+$, or less than unity, as shown in curve $308B_t^+$. When summed with the output $308A_t^+$, provide outputs corresponding to curves $308_{t1}^+$ and $308_{t2}^+$, respectively, are provided by the summer 370 resulting in a distorted modulator driver output signal 308 and, ultimately, unreliable operation of the modulator 380. While the discussion above is directed to the output 308 at node $V_{Out}^+$, it similarly applies to the creation of the output 308 at node $V_{Out}^-$.

The first and second current sources 332a, 332b are utilized to provide a DC bias to the modulator driver output signal 308 to ensure proper operation of the modulator. The current sources 332 are preferably programmable in order to obtain a desired bias voltage value, as part of output signal 308. Thus, the DC bias provided at $V_{Out}$ 308 is a function of the current of the programmable current sources 332a, 332b, as given by $I_{DAC}^{+,-} \times (X)$, where $I_{DAC}^{+,-}$ is the current provided by each of the current sources 332a, 332b, respectively, and X is a programmable variable. Preferably, each of the current sources 332 are programmed to provide equivalent currents and thus equivalent bias voltages, however, if required, each individual current source 332 can be programmed to provide a different current, to compensate for fabrication tolerances for example. The current sources 332 can be programmed through any suitable means, such as for example transistor circuits compatible with the fabrication process used or digital communication interfaces. Digital communication interfaces allow for more flexible design with respect to future developments leading to newer modulator driver circuits which require a higher level of control. One such interface known in the art is the Serial Peripheral Interface or SPI as labeled in FIG. 3A. The digital interface provides a more efficient communication path with external digital circuitry through a four-wire or three-wire digital serial interface such as SPI. In this way, a reduction in external control circuitry components, as well as corresponding printed circuit board area, is provided.

The common mode component of the output voltage $V_{Out}$ 308 is given by:

$$0.5(V_{Out}^+ + V_{Out}^-) = -R_b I_{DAC}(X) - 0.5 R_b I_o$$

where $I_{DAC} = I_{DAC}^+ = I_{DAC}^-$, and $I_o$ is the current provided by the current source 346 as part of the feed forward circuit 340. Since modulators are capacitive in nature, the capacitive load of the modulator represented by $C_L$, and assuming that the load capacitance $C_L$ dominates the output impedance, capacitor $C_L$ and capacitor 322 ($C_b$) form a voltage divider network and the differential component of the output voltage will be given by:

$$V_{Out(dif\ f)}(t) = V_{In(dif\ f)}(t) \frac{C_b}{C_b + C_L}$$

Now turning to FIG. 3D, another embodiment including a broadband Bias-T circuit will be discussed in greater detail. More specifically, the modulator driver circuit 300-1 is similar to the modulator driver circuit 300 of FIG. 3A, however only provides a single output, e.g. a single-ended output, rather than a differential output. The discussion above with respect to the embodiment of FIG. 3A above applies here, as well. In particular, the summer 370 sums a first signal received from the coupling circuit 322 (represented by signal 308A) and a second signal received from the feed forward circuit 340 (represented by signal 308B⁺) to provide an output 308, labeled $V_{Out}$, relative to the second voltage potential 362 for example. In the circuit 300-1, the coupling circuit 322 includes a capacitor 322a. If the data waveform includes positive going pulses having pulse widths greater than the timing constant associated with the capacitor 322 and the resistor 330*a*, that portion of the output 308 provided from the coupling circuit 322 (308A) will decrease. However, as discussed above, that portion of the output 308 provided from the feed forward circuit 340 will increase at the exact same rate and, thus, provide a desired flat response at the output 308. The DC bias is further adjusted through the use of the programmable current source 332.

Output 306B$^+$ from the high speed buffer can optionally be provided to the base of the second transistor 342*b* of the feed forward circuit 340, as depicted in dashed line. While the output 306B$^+$ will not directly impact the single-ended output 308, providing this optional connection will act to reduce system noise. Alternatively, the base of the transistor 342*b* may be connected to a bias voltage (not shown) such that the transistors 342*a*, 342*b*, configured as a differential pair, can properly steer current in response to signal 306B$^-$.

Now turning to FIG. 3E, still another embodiment including a broadband Bias-T circuit will be discussed in greater detail. More specifically, the modulator driver circuit 300-2 is similar to the modulator driver circuit 300-1 of FIG. 3D, however accepts a single ended input, rather than a differential input as depicted in the embodiment of FIG. 3D. The discussion with respect to the embodiment of FIG. 3D above applies here, as well. In particular, the summer 370 sums that portion of the output 308A received from the coupling circuit 322 and the output 306B received from the feed forward circuit 340 to provide an output 308A, labeled $V_{Out}$, relative to the second voltage potential 362 for example. If the data waveform includes positive going pulses having pulse widths greater than the timing constant associated with the capacitor 322 and a resistor 330, that portion of the output 308A provided from capacitor 322 will decrease. However, as discussed above, that portion of the output of 308A provided from the output of the feed forward circuit 340, and represented by signal 308B$^+$, will increase at the exact same rate and, thus, provide a desired flat response at the output 308A. If necessary, the DC bias is further adjusted through the use of the programmable current source 332.

Figure 3D:
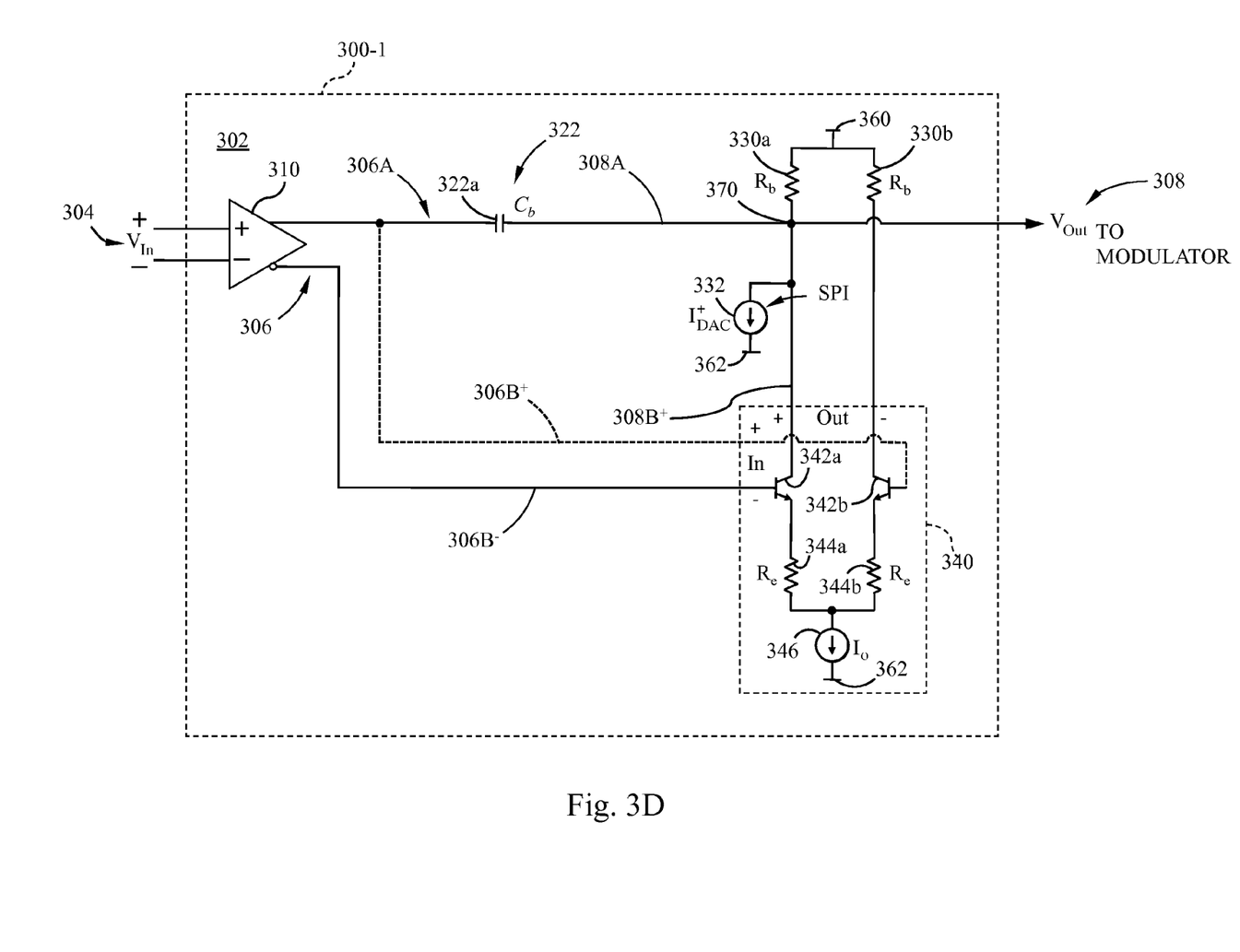
FIG. 3D is a general circuit diagram of another broadband Bias-T circuit, according to certain aspects of the present invention.
Figure 3E:
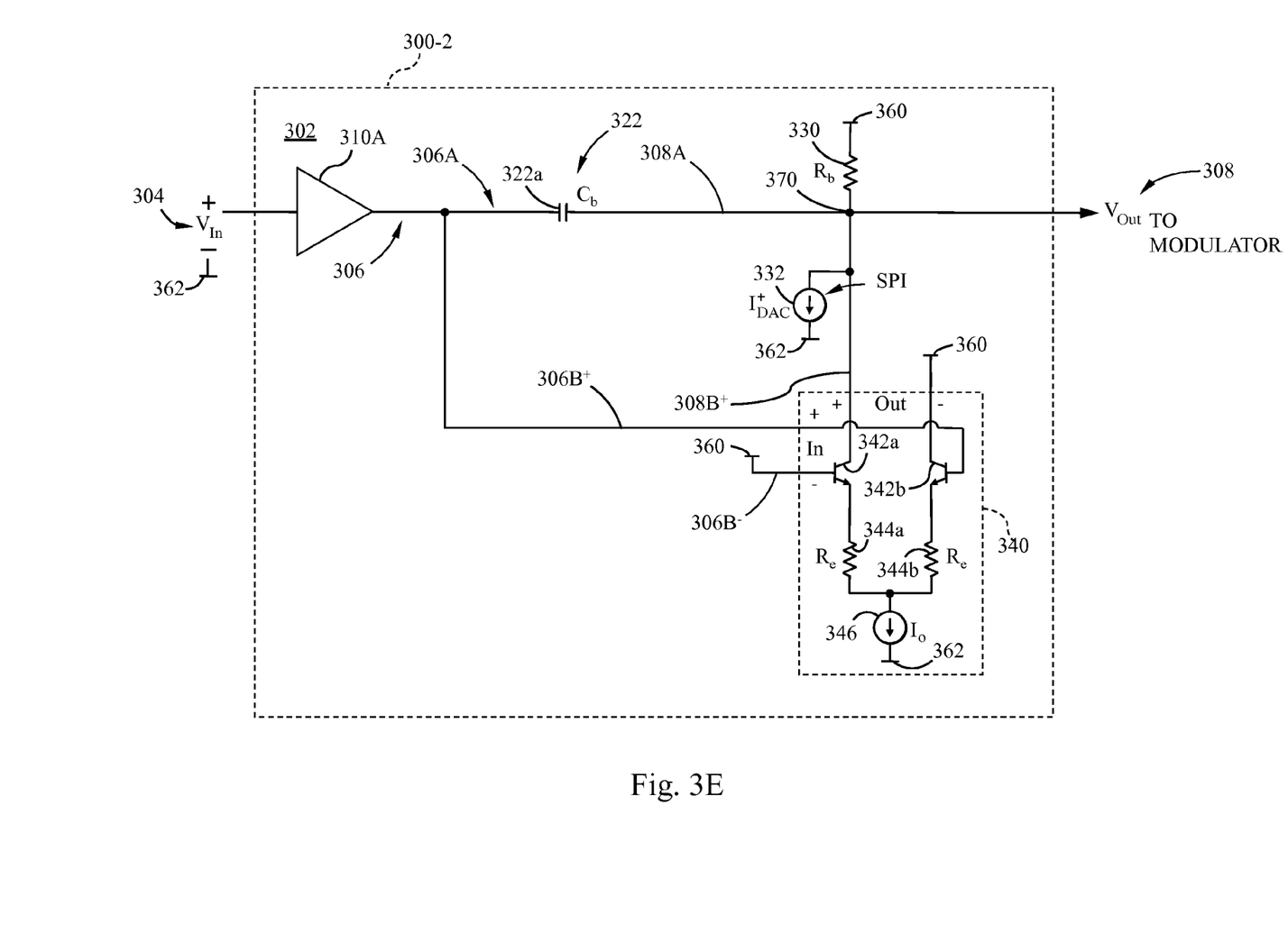
FIG. 3E is a general circuit diagram of still another broadband Bias-T circuit, according to certain aspects of the present invention.
Figure 4:
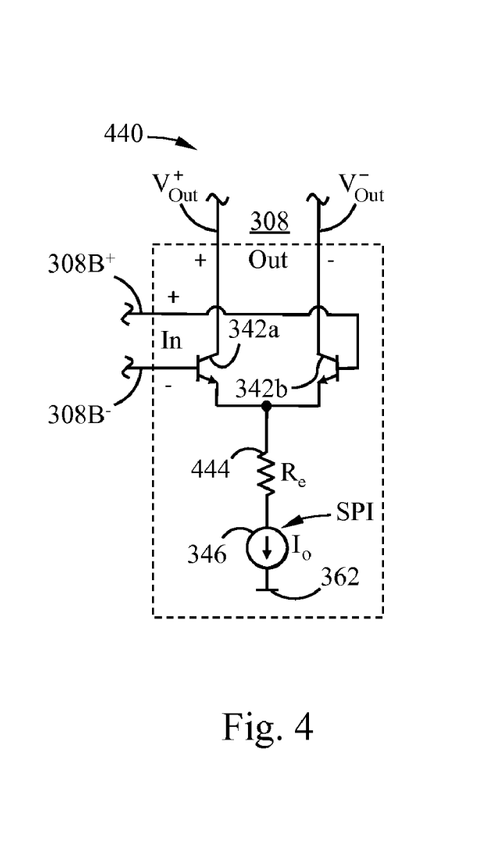
FIG. 4 is a first exemplary differential pair sub-circuit which may be used in connection with the embodiment of FIG. 3A, according to certain aspects of the present invention.
Figure 5:
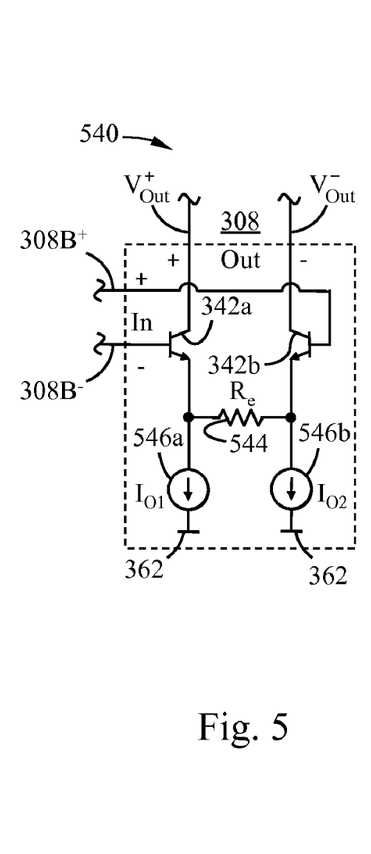
FIG. 5 is a second exemplary differential pair sub-circuit which may be used in connection with the embodiment of FIG. 3A, according to certain aspects of the present invention.

The differential pair circuit 340 depicted in FIGS. 3A and 3D is one of many different differential pair circuits which can be utilized to provide a portion of the bias, as part of the output signal 308. FIG. 4 depicts a first exemplary differential pair circuit 440 which may be used with the modulator drive circuit 300, replacing the differential circuit 340. Circuit 440 is similar to circuit 340, however the resistors 344*a*, 344*b* are replaced with a single resistor 444, as depicted in FIG. 4. FIG. 5 depicts a second exemplary differential pair circuit 540, a resistor 544 replacing the resistors 344. As depicted, the emitter of transistor 542*a* is connected to a first end of a first current source 546*a*, while the emitter of transistor 342*b* is connected to a first end of a second current source 546*b*. A first end of the resistor 544 is connected to the first end of the first current source 546*a* and the second end of the resistor 544 is connected to the first end of the second current source 546*b*. A second end of the first current source 546*a* and a second end of the second current source 546*b* both connected to the second voltage potential 362, as depicted in FIG. 5.

Figure 6:
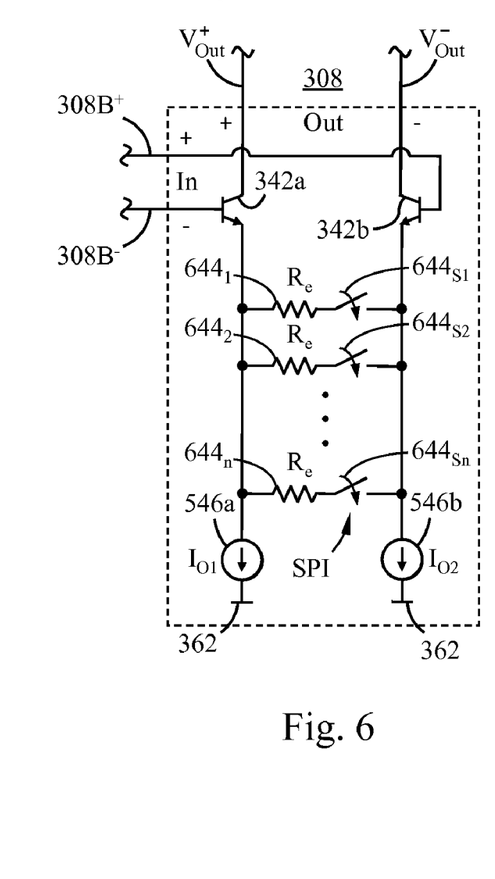
FIG. 6 is a third exemplary differential pair sub-circuit which may be used in connection with the embodiment of FIG. 3A, according to certain aspects of the present invention.

Another exemplary differential pair circuit 640 is depicted in FIG. 6. The differential pair circuit 640 is similar to circuit 540, however the resistor 544 of circuit 540 is replaced with a plurality of resistor circuits, each comprising a resistor 644 and switch 644$_S$. Each of the switches 644$_S$ are programmable such that through application of one or more of the switches 644$_{Sn}$ a corresponding one of a plurality of different resistances is provided between the first end of the first current source 546*a* and the first end of the second current source 546*b*. As should be apparent, by setting each of the switches 644$_{Sn}$ a desired resistance can be created to obtain the desired transconductance gain of the differential pair circuit 640. Each switch 644$_{Sn}$ can be provided in any suitable manner, for example through transistor circuits compatible with the fabrication process. Further, each switch 644$_{Sn}$ can be programmable through any suitable means, such as for example through transistor circuitry or a digital communication interface such as SPI. As one of ordinary skill in the art will realize, while depicted as a plurality of resistor circuits, each of the plurality of resistor circuits connected parallel to each other, some or all of the plurality of resistor circuits may also be arranged in series with respect to each other. For example, a first group of resistor circuits may be arranged in series with respect to other resistor circuits in the first group, while a second group of resistor circuits may be arranged in parallel with respect to other resistor circuits in the second group.

Figure 7:
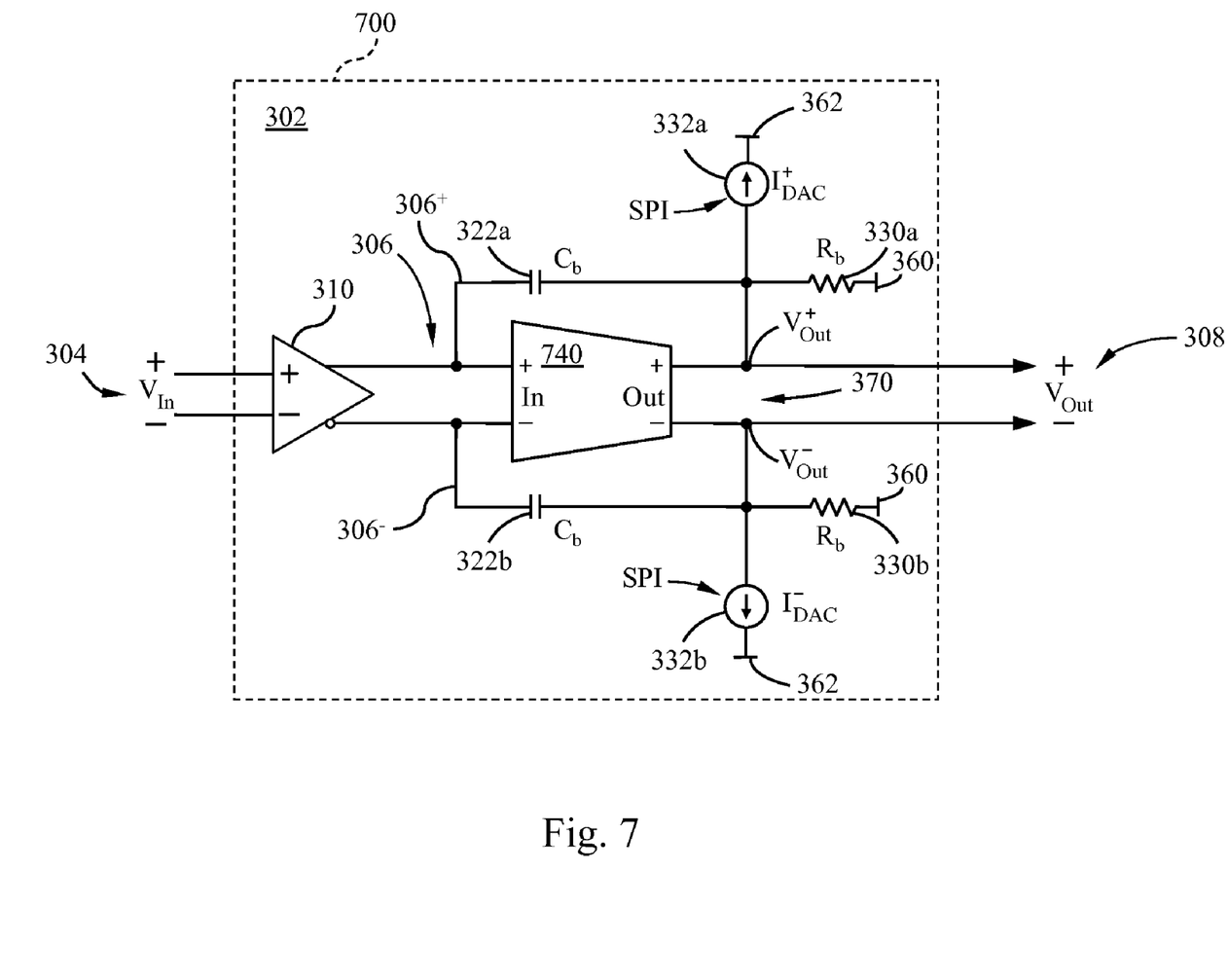
FIG. 7 is a simplified general circuit diagram of the FIG. 3A embodiment of a broadband Bias-T circuit comprising a differential pair sub-circuit.

Turning to FIG. 7, a simplified circuit diagram of the embodiment of FIG. 3A is depicted. Modulator drive circuit 700 includes a feed forward circuit 740 which can be any suitable feed forward circuit described herein, for example the feed forward circuits 340, 440, 540, and 640 of FIGS. 3, 4, 5, and 6, respectively. The remainder of the components are similar to those in the embodiment of FIG. 3A.

With the transconductance of the feed forward circuit 740 equaling $g_m$, it can be shown that the frequency response of the modulator drive circuit 700 is given by:

$$\frac{V_o(s)}{V_i(s)} = \frac{g_m + sC}{R_b^{-1} + sC}$$

where the capacitance of the load, for example the capacitance of the modulator 380, is ignored. Thus, in order for the modulator drive circuit 700 to provide a flat frequency response, $g_m$ must be matched to $R_b^{-1}$, where $R_b$ is the resistance value of each of the resistors 330. The value $g_m$ is inversely related to the emitter degeneration resistors, for example resistors $R_e$ of FIGS. 3A, 3D, 3D, 4, 5, and 6. For low resistance values, however, this matching will be difficult to attain over manufacturing tolerances, any mismatching leading to signal distortion of the modulator drive output signal 708. Thus, for low resistance values, e.g. resistors 344 of the feed forward circuit 340 or resistors 330, it is preferable to provide a programmable resistive circuit, such as depicted in the feed forward circuit 640 of FIG. 6 in which one or more of the resistors 644$_n$ can be selected to provide a resistive circuit having a desired resistance.

The feed forward circuits of FIGS. 3A and 4 are linear stage circuits, including emitter degeneration resistors $R_e$. The emitter resistors, for example resistors 344, 444 of the feed forward circuits of FIGS. 3A and 4, respectively, require a certain amount of voltage headroom, such that the feed forward circuit 340, 440 operates in a linear region. That is, the current source 346 provides a current through the resistors 344, 444 resulting in a voltage drop. This voltage drop defines a minimum voltage at the emitter of a corresponding transistor 342, as part of the feed forward circuit 340, 440 resulting in unnecessary power consumption. One way to overcome this issue is to lower the resistive values of the emitter resistors, however this results in the feed forward circuits becoming more limiting in operation, leading to undesirable attenuation and, ultimately, signal distortion. To reduce the voltage headroom, preferably, an attenuation circuit can be provided at the input of the feed forward circuit 740. The attenuation circuit cooperates with a reduced resistance value for the degeneration resistors to allow the feed forward circuit to operate in a linear region. Such an exemplary circuit is depicted in FIG. 8.

Figure 8:
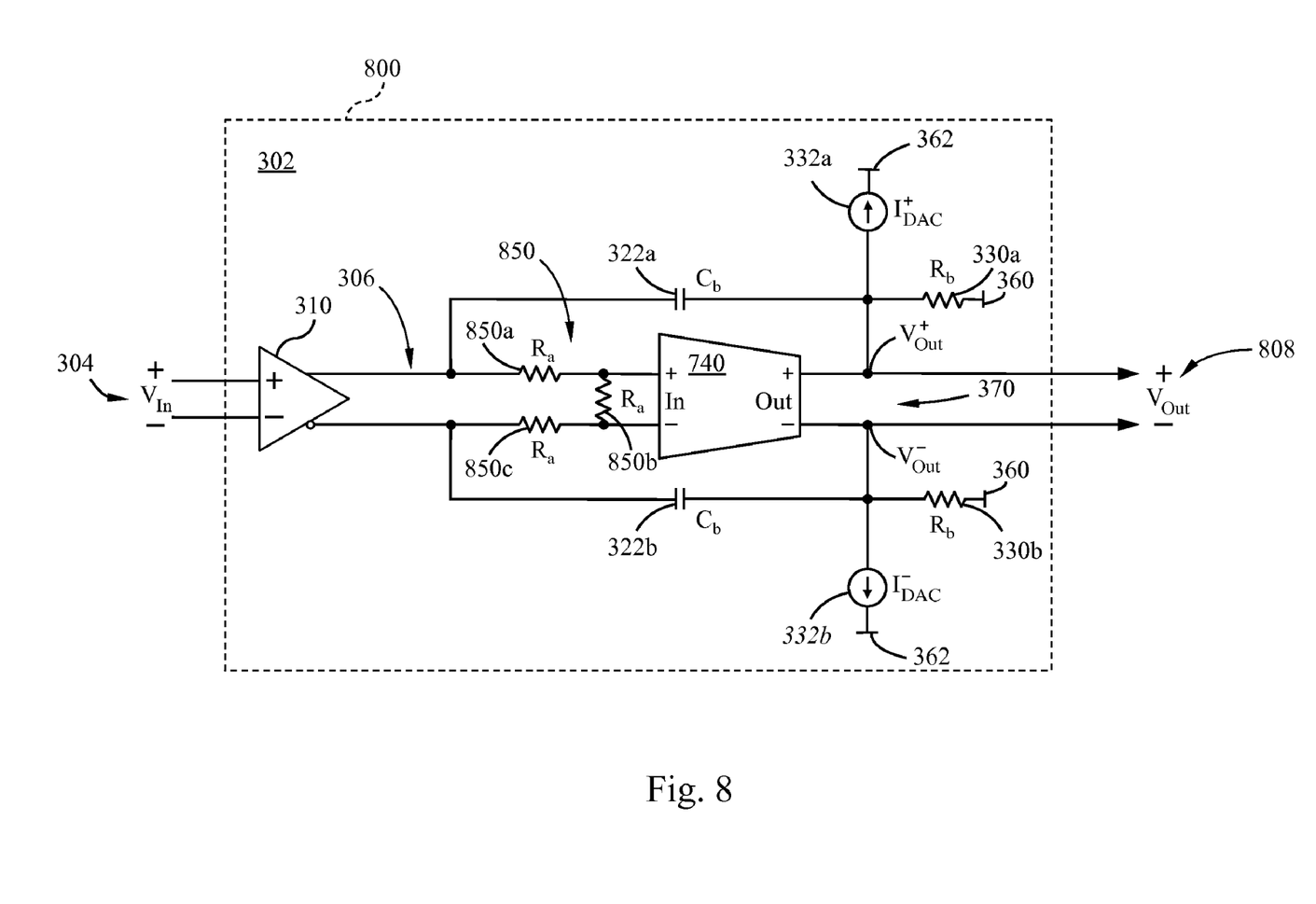
FIG. 8 is a general circuit diagram of yet another embodiment of a broadband Bias-T circuit, according to certain aspects of the present invention.

The modulator drive circuit 800 of FIG. 8 is similar to the modulator drive circuit 700, however includes an attenuator circuit 850. As with other embodiments described herein, driver 310 accepts the input signal 304 and provides a differential output signal 306. The differential output signal 306 is then provided to first and second capacitors 322a, 322b as described above with respect to modulator drive circuit 700 of FIG. 7. The differential output signal 306 is also provided to the attenuator circuit 850. The attenuator circuit includes a first, a second, and a third resistor 850a, 850b, 850c which attenuates the differential signal 306 prior to entering the differential pair circuit 740. While depicted as a three-resistor circuit, one of ordinary skill in the art will appreciate that the attenuator circuit 850 can be constructed of more or less electrical components arranged in different ways to achieve the desired signal attenuation. The addition of the attenuator circuit 850 allows the feed forward circuit 740 to have an increased operating range, as compared to the embodiment of FIG. 7 for example.

As with other embodiments described herein, although not required, the various components of the modulator driver circuit 700, 800 is provided on the single substrate 302. Under certain applications, the addition of extra components on the substrate 302 is undesirable due to space limitations or speed constraints associated with the circuit design, for example the addition of the emitter resistors of the feed forward circuit 640 to allow for proper component matching such that the high frequency response and the low frequency response provide for an overall flat response. In such a situation the current source associated with the feed forward circuit can be made programmable, as described with reference to FIGS. 9A and 9B.

Figure 9A:
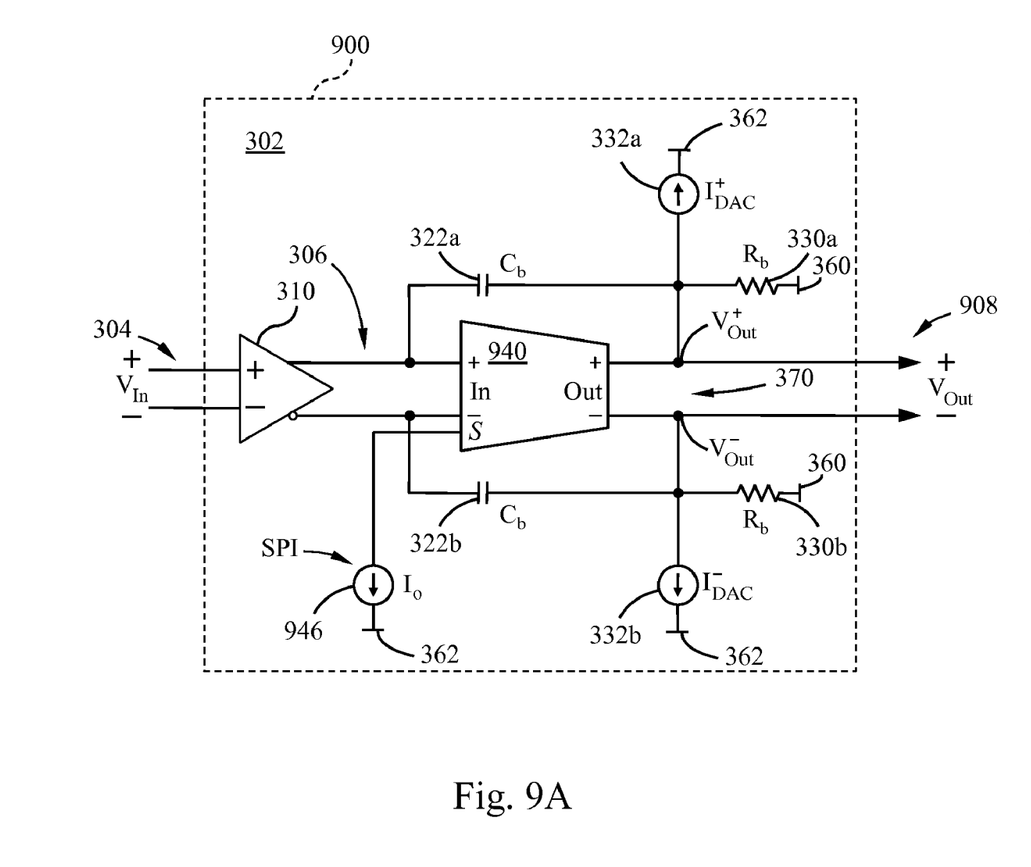
FIG. 9A is a general circuit diagram of another embodiment of a broadband Bias-T circuit, according to certain aspects of the present invention.
Figure 9B:
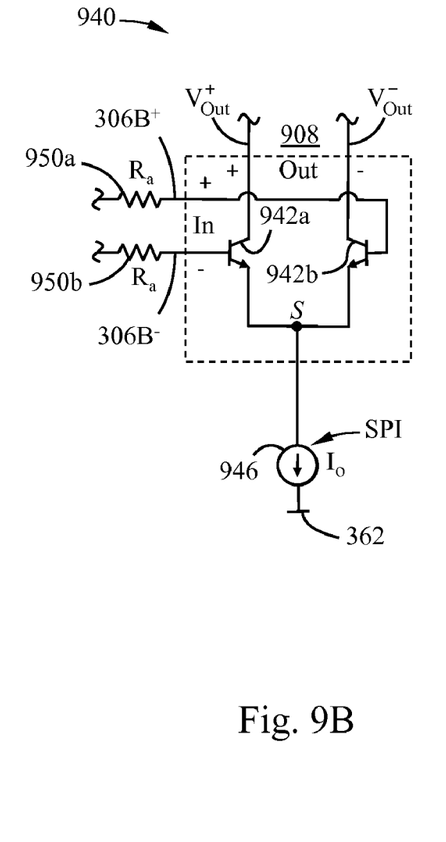
FIG. 9B is a general circuit diagram of the differential pair sub-circuit of the embodiment of FIG. 9A, according to certain aspects of the present invention.

Now turning to FIG. 9A, another embodiment of a modulator drive circuit 900 in accordance with the present invention is provided. The modulator drive circuit 900, preferably provided on a single substrate 302, is similar to the modulator drive circuit 800, however includes a feed forward circuit 940. With reference to FIG. 9B, the feed forward circuit 940 is a non-linear stage which includes a first transistor 942a and a second transistor 942b. The base of the first transistor 942a accepts inverted input 306B$^-$. The emitter of the first transistor 942a is coupled to the first end of a programmable current source 946 (shown external to the differential circuit 740 for purposes of clarity), at a point labeled "S" for example, the second end of the programmable current source coupled to voltage potential 362. The base of the second transistor 942b accepts input 306B$^+$. The emitter of the second transistor 942b is coupled to the first end of the programmable current source 946. As with other programmable current sources described herein, such programmability can be provided through transistor circuitry or digital communication interfaces such as SPI. While only a single current source 946 is depicted, multiple programmable sources 946n can be provided according to the feed forward circuit utilized, such as the feed forward circuits 340, 440, 540, and 640 of FIGS. 3, 4, 5, and 6, respectively. Adjustment of the current provided by the current source 946 will adjust the gain of the low frequency response of the feed forward circuit, the gain defined by the current of the source 946 and the resistors 330. Therefore, the gain of the low frequency response can be set to match the gain of the high frequency response, providing an overall flat response across a desired frequency range of operation.

Even though the feed forward circuit 940 of the modulator drive circuit 900 is a limiting stage, linear superposition can be used to analyze the response of the modulator drive circuit 900 as long as waveforms that appear at the input of the feed forward circuit 940, for example signal 306, are confined to step functions of the same magnitude, but not necessarily the same sign. Therefore, the solution is the combination of a high frequency solution and a low frequency solution. With the input node exited with a step function given by:

$$V_{In}(t)=V_{ac}(u(t)-0.5)$$

where u(t) is an ideal step function that is equal to 0 for t less than zero and is equal to 1 for t greater than or equal to zero.

In considering the high frequency solution, the input to the feed forward circuit 940 is shorted and disconnected from the remainder of the circuit 900, the step function applied across the capacitors 322. In response to the step function, the output $V_{Out}$ 908, (defined as Vout$^+$–Vout$^-$) is given by:

$$V_{Out\_HF}(t)=V_{ac}u(t)e^{t/\tau}$$

For the low pass solution, the output current of the feed forward circuit 940 is given by:

$$I_{Out}(t)=I_{DiffDC}u(t)$$

and injected into a low pass filter determined by $C_b$ and $R_b$. The developed output voltage at $V_{Out}$ 908 is given by:

$$V_{Out\_LF}(t)=I_{DiffDC}R_b u(t)(1-e^{t/\tau})-0.5I_{DiffDC}R_b$$

Thus, the total solution is:

$$V_{Out\_Total}(t) = V_{Out\_HF}(t) + V_{Out\_LF}(t)$$
$$= V_{ac}u(t)e^{t/\tau} + I_{Dif\_fDC}R_b u(t)(1-e^{t/\tau}) - 0.5I_{Dif\_fDC}R_b$$
$$= (V_{ac} - I_{Dif\_fDC}R_b)u(t)e^{t/\tau} + I_{Dif\_fDC}R_b(u(t)-0.5)$$

If the current is adjusted such that the low pass response has the same magnitude as the high-pass response, then:

$$V_{ac}=I_{DiffDC}R_b$$

then the output voltage is simplified to:

$$V_{Out\_Total}(t)=V_{ac}(u(t)-0.5)=V_{In}(t)$$

While the invention has been described in conjunction with several specific embodiments, it is evident to those skilled in the art that many further alternatives, modifications and variations will be apparent in light of the foregoing description. For example, principals of operation of the modulator driver circuit of this invention may be applied to other types of optical modulators, other than MZM or EAMs or example, or any other type of electro-optic modulator that relies on the electro-optic effect to change the refractive index of a certain material through the application of an applied electric field. Thus, the invention described herein is intended to embrace all such alternatives, modifications, applications and variations as may fall within the spirit and scope of the appended claims.

What is claimed is:

1. An integrated device comprising:
a first circuit having an input and an output, the input of the first circuit configured to receive an input signal and provide a first signal on the output of the first circuit;
a second circuit having an input and an output, the input of the second circuit configured to receive the input signal and provide a second signal on the output of the second circuit; and a third circuit having a first input configured to receive the first signal and a second input configured to receive the second signal, the third circuit configured to combine the first signal and the second signal into a modulator drive output signal provided on an output of the third circuit, wherein the second signal is complementary to the first signal, and wherein the third circuit comprises a current source and a resistor, the current source cooperating with the resister to provide a bias signal, the third circuit configured to combine the bias signal, and the first signal and the second signal into the modulator drive output signal provided on the output of the third circuit.

2. The integrated circuit of claim 1, wherein the input signal is a differential signal and the modulator drive output signal is a differential modulator drive output signal.

3. The integrated device of claim 1, wherein the input signal is a single-ended signal and the modulator drive output signal is a single-ended modulator drive output signal.

4. The integrated device of claim 1, wherein the first circuit cooperates with the third circuit, such that the first signal is a high-pass response of the input signal having a first cutoff frequency, and the second circuit cooperates with the first circuit and the third circuit, such that the second signal is a low-pass response of the input signal having a second cutoff frequency.

5. The integrated device of claim 4, wherein the first cutoff frequency is substantially equal to the second cutoff frequency.

6. The integrated circuit of claim 1, wherein the first signal has a first frequency response and the second signal has a second frequency response which does not overlap the first frequency response.

7. The integrated circuit of claim 1, wherein the first signal has a first amplitude and the second signal has a second amplitude substantially the same as the first amplitude.

8. The integrated device of claim 1, wherein the current source is a programmable current source, such that the bias signal is programmable.

9. The integrated device of claim 8, wherein the programmable current source is controlled by a digital communication interface.

10. The integrated device of claim 9, wherein the digital communication interface is a 3-wire Serial Peripheral Interface or a 4-wire Serial Peripheral Interface.

11. The integrated device of claim 1, wherein the modulator is an electro-absorption modulator.

12. The integrated device of claim 11, wherein the first, second and third circuits are one of a plurality of modulated drive circuits provided on the single substrate.

13. The integrated device of claim 1, wherein the modulator is a Mach-Zehnder modulator.

14. The integrated device of claim 1, wherein the first, second and third circuits are provided on a single substrate.

15. An integrated device comprising:

a first circuit having an input and an output, the input of the first circuit configured to receive an input signal and provide a first signal on the output of the first circuit;

a second circuit having an input and an output, the input of the second circuit configured to receive the input signal and provide a second signal on the output of the second circuit; and a third circuit having a first input configured to receive the first signal and a second input configured to receive the second signal, the third circuit configured to combine the first signal and the second signal into a modulator drive output signal provided on an output of the third circuit, wherein the second signal is complementary to the first signal, wherein the input signal is a differential signal and the modulator drive output signal is a differential modulator drive output signal, and wherein the differential modulator drive output signal includes a first differential modulator drive output signal and a second differential modulator drive output signal, the third circuit further comprising a first current source coupled to the first output signal and a second current source coupled to the second output signal, the first current source providing a first bias signal and the second current source providing a second bias signal, the first differential modulator drive output signal comprising the first bias signal and the second differential modulator drive output signal comprising the second bias signal.

16. The integrated device of claim 15, wherein the first current source is a first programmable current source and the second current source is a second programmable current source.

17. The integrated device of claim 16, wherein the first programmable current source and the second programmable current source are controlled via a digital communication interface.

18. The integrated device of claim 17, wherein the digital communication interface is a 3-wire Serial Peripheral Interface or a four-wire Serial Peripheral Interface.

* * * * *